March 28, 1961 W. T. ROSSELL 2,976,819
RAIL TRUCK
Filed Aug. 21, 1958 2 Sheets-Sheet 1
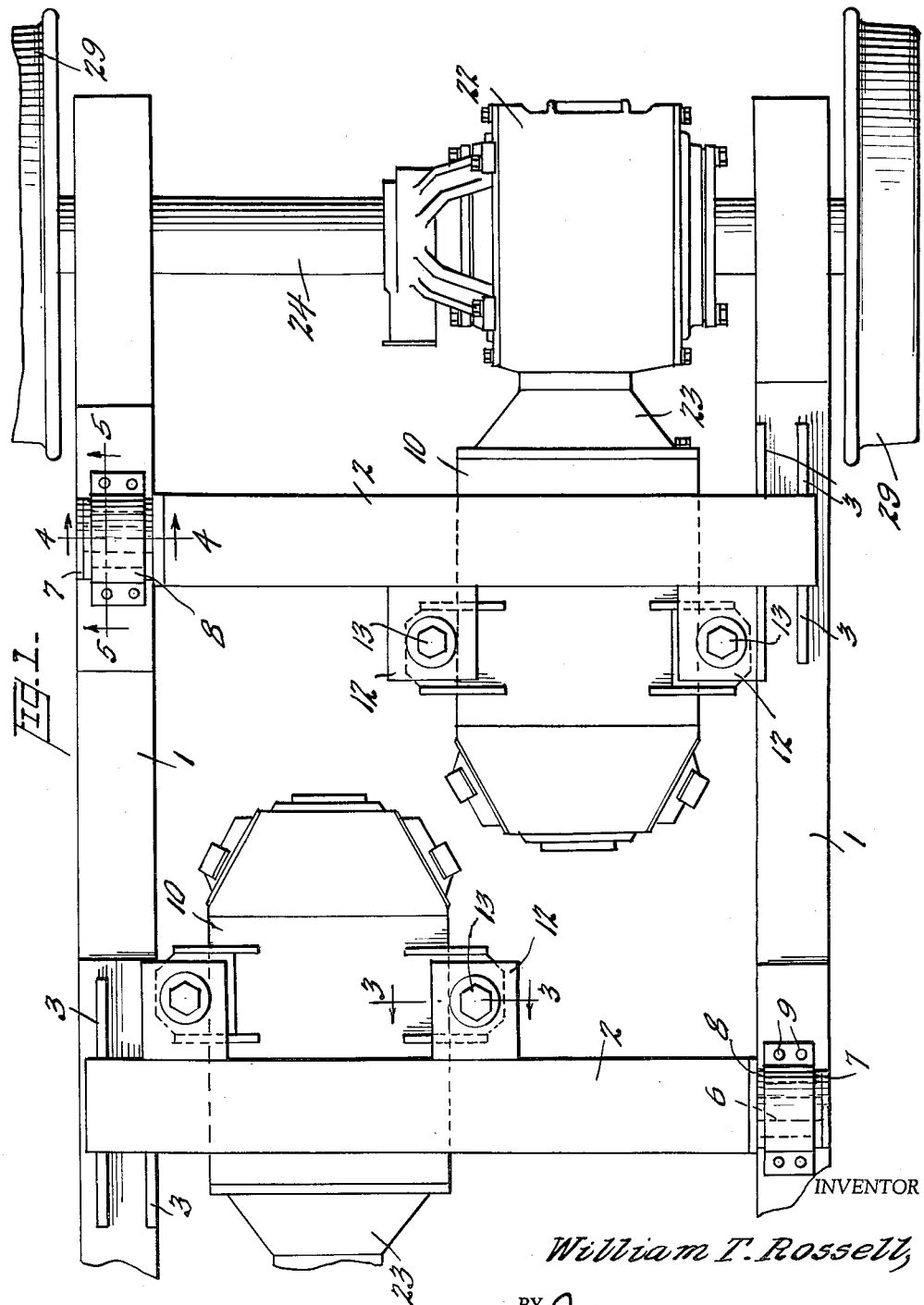
INVENTOR
William T. Rossell,
BY
ATTORNEY March 28, 1961 W. T. ROSSELL 2,976,819
RAIL TRUCK
Filed Aug. 21, 1958 2 Sheets-Sheet 2
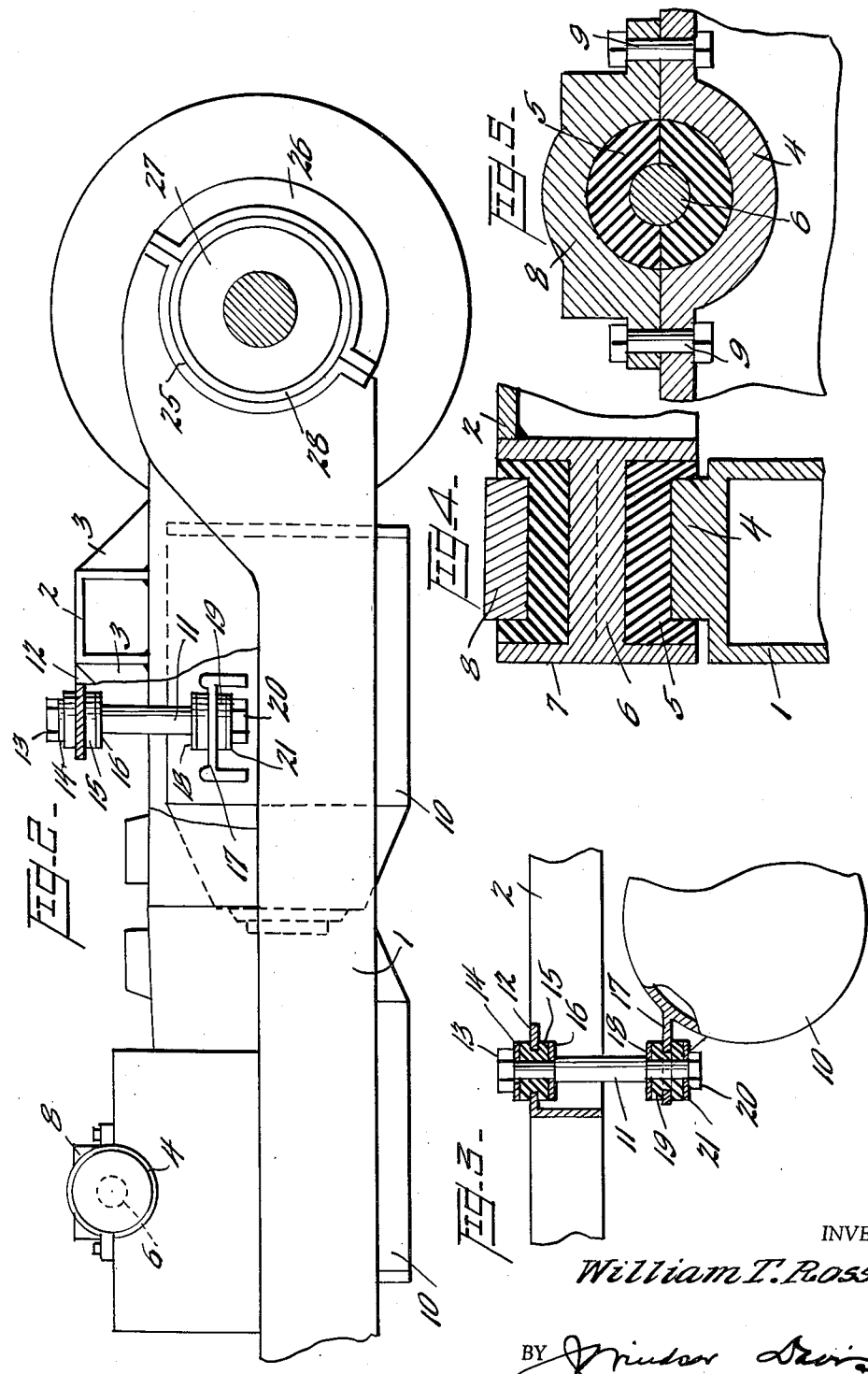
INVENTOR
William T. Rossell,
BY
ATTORNEY

United States Patent Office 2,976,819
Patented Mar. 28, 1961

2,976,819
RAIL TRUCK

William T. Rossell, New York, N.Y., assignor to Transit Research Corporation, New York, N.Y., a corporation of New York Filed Aug. 21, 1958, Ser. No. 756,482
8 Claims. (Cl. 105—138)

This invention relates to rail trucks and has for its object to provide a sturdy truck of improved riding quality, simplified design and of light weight which will render it particularly adaptable for rapid transit passenger service.

A principal object of the invention is to provide a truck frame designed to permit a short, rigid coupling of the main motors to the axles thus eliminating the conventional universal joints. This eliminates a source of vibration and a point of maintenance and makes for more economical construction. The truck is squared by cross members instead of axle housings thus eliminating, also, the cost and weight of the housings.

More particularly it is an object of the invention to provide a truck frame composed of two side frames and to connect them by cross members in such manner that the frames will have some freedom of relative movement through relative vertical arcs, thus permitting a wheel at one corner of the truck to be elevated or lowered without imposing undue strain on the side frames or cross members, the arrangement also offering substantial but cushioned resistance to longitudinal displacement of one side frame with respect to the other, thus assuring that the side frames will remain in tram.

Another object of the invention is to provide side frames in slightly resilient operative relation with their journal bearings, the journal bearings being connected to the side frames through rubber rings. According to this arrangement the journal bearings will never have free movement, as is the case where pedestal guides are used, but are always restrained by the rubber which permits very slight relative movement between the side frames and their journal bearings.

Another object of the invention is to provide truck driving motors and to employ the cross members for the support thereof, the actual supporting means including rubber cushions which provide slight resilience, but whose principal function is to damp the transmission of vibrations of the motors to the frame.

Other objects and advantages will become hereinafter more fully apparent as reference is had to the accompanying drawing wherein my invention is illustrated and in which Figure 1 is a top plan view of a rail truck constructed in accordance with my invention, the bolster being omitted and one axle with its gear housing and wheels not being shown, Figure 2 is a side elevation, partially broken away for purpose of explanation, of that portion of the truck shown in Figure 1, Figure 3 is a detail section taken along the line 3—3 of Figure 1, showing one motor suspension, Figure 4 is a detail cross section taken along the line 4—4 of Figure 1, and Figure 5 is a detail cross section taken along the line 5—5 of Figure 1.

More particularly, 1 indicates the main side frames of the truck which are connected together by cross members 2. The frames 1 are each connected to the end of one cross member at 3 by bolting or welding in order to form a sturdy rigid connection, and connected to one end of the other side frame through a resilient connection best shown in Figures 4 and 5.

In Figures 4 and 5, it will be seen that each side frame 1 has an arcuate, depressed portion 4 which receives a split rubber bushing 5 in the shape of a spool. This bushing, in turn, receives a cylindrical end piece 6 which is welded or formed integrally with the end of its cross member and in extension thereof. The end piece 6 has a cap 7 rigid therewith to retain the bushing and to suppress its resiliency when the arcuate cap or cover 8 is applied thereover. The cap 8 is bolted at 9 to its side frame 1.

The bushings 5 have slight resiliency, insufficient to permit a noticeable loss of tram by the side frames but sufficient to act as a hinge to permit the elevation or depression of one wheel without affecting the others and without imposing undue stresses on the side frames.

Each cross member 2 supports one of the main motors 10 as best seen in Figures 2 and 3. A pair of bolts 11 extend downwardly through each cross member or through an integral extension 12 thereon. The upper end of each bolt has a nut 13 and a washer 14 therebeneath which is separated from the extension 12 by means of a rubber grommet or bushing 15 which extends above and below the extension 12. A second washer 16 on the bolt, below the extension 12 can impose pressure on the lower part of the bushing 15 when an upward force is applied to the bolt 11.

The lower part of each bolt 11 extends through an ear or extension 17 integral with the casing of a motor 10, there being two extensions arising from spaced points on the motors as seen in Figure 1. Each bolt 11 is provided with a washer 18, a grommet or bushing 19 therebelow, encircling the bolt and extending through each extension 17. A nut 20 on the lower end of the bolt 11 has a washer 21 separating it from the bushing 19. Thus, each motor is supported through the rubber 19 on the bolts 11, and the bolts 11, in turn, are supported through rubber bushings 15 by a cross member 2.

It is to be noted that the rubber bushings 15 and 19 are not intended as real springs but rather to avoid a rigid connection of the motors to the cross members and to damp high frequency oscillations arising in the motors.

Each motor 10 is rigidly connected to a gear housing 22, each gear housing having a flared end 23 for bolted connection to the housing of a motor. Each gear housing contains the usual drive shaft and gearing for connecting the motor in driving relation with an axle 24 which extends through the housing.

Each side frame 1 has a semicircular opening 25 having an arcuate cap 26 bolted thereto so that each side frame may be said to have a circular opening at each end thereof. A journal bearing 27 is positioned in each of these circular openings and is separated from contact therewith by means of a rubber ring 28. Thus, while the journal bearings 27 are provided with slight resiliency with respect to the side frames 1 to prevent de-railing, they do not have the freedom commonly provided by pedestal guides which would be expected to lead to hunting.

The journal bearings, of course, encircle the axles, and the axles extend into wheels 29 which rotate therewith.

I desire to be extended protection as defined by the scope of the appended claims:

What I claim is:

1. A railway truck comprising truck side frames, two spaced cross members connecting said side frames intermediate the ends of said side frames, each of said side frames being resiliently connected to one of said cross members and rigidly connected to the other thereof, said cross members and their connections to said side frames being of sturdy construction and maintaining said side frames in tram, each of said side frames having a circular opening at each end thereof, a journal bearing positioned in each of said circular openings and separated from the walls thereof by a ring of rubber, and axles connecting said journal bearings in pairs.

2. A railway truck comprising truck side frames, spaced cross members connecting said side frames intermediate the ends of said side frames, each of said side frames being resiliently connected to one of said cross members and rigidly connected to the other thereof, said cross members and their connections to said side frames being of sturdy construction and maintaining said side frames in tram, each of said side frames having a large circular opening at each end thereof, a journal bearing residing in each of said openings, a rubber ring separating the wall of each of said openings from its journal bearing, axles connecting said juornal bearings in pairs, and driving motors each resiliently supported by one of said cross members.

3. A railway truck comprising truck side frames, spaced cross members connecting said side frames, each of said side frames being rigidly connected to one of said cross members and connected to the other thereof by a hinge, each of said hinges having a hinge pin paralleling the direction of its cross member and rigidly secured thereto, each of said hinge pins being separated from its side frame through a rubber bushing, said cross members and their connections to said side frames maintaining said side frames in tram while allowing slight rocking of said side frames with respect to each other through a vertical arc, each of said side frames having an opening at each end thereof to receive a journal bearing, the wall of each of said openings being separated from its journal bearing by a rubber ring, said journal bearings being connected in pairs by axles.

4. A railway truck comprising truck side frames, spaced cross members connecting said side frames, each of said side frames being rigidly connected to one of said cross members and connected to the other thereof by a hinge, each of said hinges having a hinge pin paralleling the direction of its cross member and rigidly secured thereto, each of said hinge pins being separated from its side frame through a rubber bushing, said cross members and their connections to said side frames maintaining said side frames in tram while allowing slight rocking of said side frames with respect to each other through a vertical arc, each of said side frames having an opening at each end thereof to receive a journal bearing, a journal bearing in each of said openings, the wall of each of said openings being separated from its journal bearing by a rubber ring, said journal bearings being connected in pairs by axles, and truck driving motors, one of said motors being resiliently supported by each of said cross members.

5. A railway truck comprising truck side frames, spaced cross members connecting said side frames, each of said side frames being rigidly connected to one of said cross members and connected to the other thereof by a hinge, each of said hinges having a hinge pin paralleling the direction of its cross member and rigidly secured thereto, each of said hinge pins being separated from its side frame through a rubber bushing, said cross members and their connections to said side frames maintaining said side frames in tram while allowing slight rocking of said side frames with respect to each other through a vertical arc, each of said side frames having an opening at each end thereof to receive a journal bearing, a journal bearing in each of said openings, the wall of each of said openings being separated from its journal bearing by a rubber ring, said journal bearings being connected in pairs by axles, and truck driving motors each having two spaced flanges having openings therethrough, bolts through said openings extending vertically above said motors, each of said cross members having openings receiving the bolts of one of said motors, a nut for each of said bolts and a rubber bushing between each of said nuts and its cross member, thereby providing resilient support for said motors.

6. A railway truck comprising side frames, cross members and main motors, said cross members being mutually parallel and located intermediate the ends of said side frames, said side frames each being rigidly connected to one of said cross members and connected to the other thereof by a hinge, each of said cross members carrying a hinge pin paralleling its length, a rubber bushing encircling each of said hinge pins and a clamp attaching each of said bushings to its side frame, said cross members and their connections to said side frames maintaining said side frames in tram while allowing slight rocking of said side frames with respect to each other through a vertical arc, and means including a rubber mounting supporting each of said motors below one of said cross members.

7. In a railway truck, a truck frame comprising side members having circular openings at each end of each thereof and cross members connecting said side frames, said side frames being resiliently connected at diagonal points to said cross members and rigidly connected thereto at the other to diagonal points, said cross members with their connections to said side frames maintaining said side frames in tram while permitting slight relative rocking thereof through vertical arcs, journal bearings residing in said openings, axles positioned in said journal bearings, a rubber ring separating each of said journal bearings from the wall of its opening, a main motor resiliently supported from each of said cross members, a gear housing housing each of said axles, and a coupling member rigidly connecting the housing of each of said motors with one of said gear housings, said axles being exposed between said gear housings and said journal bearings.

8. In a railway truck, a truck frame comprising side frames each having a circular opening through each end thereof and cross members, each of said side frames being hingedly connected to one of said cross members and rigidly connected to the other thereof, said cross members and their connections to said side frames being of sturdy construction and maintaining said side frames in tram, a main motor resiliently supported by each of said cross members, a journal bearing located in each of said openings, a ring of rubber separating each of said journal bearings from the wall of its opening, axles positioned in said journal bearings, a gear housing on each of said axles, and a coupling rigidly connecting each of said motors with one of said housings, said axles being exposed between said gear housings and said journal bearings.

References Cited in the file of this patent

UNITED STATES PATENTS

| | | |
|---|---|---|
| 433,754 | Wharton | Aug. 5, 1890 |
| 556,893 | Lundqvist | Mar. 24, 1896 |
| 592,151 | Lundqvist | Oct. 19, 1897 |
| 2,253,042 | Muchnic | Aug. 19, 1941 |
| 2,358,279 | Piron | Sept. 12, 1944 |
| 2,737,126 | Rossell | Mar. 6, 1956 |